United States Patent
Lee et al.

(10) Patent No.: US 11,212,669 B2
(45) Date of Patent: Dec. 28, 2021

(54) METHOD FOR HANDLING OF A PROHIBIT TIMER TO TRANSMIT A RRC MESSAGE RELATED TO UE CAPABILITY RESTRICTION IN WIRELESS COMMUNICATION SYSTEM AND A DEVICE THEREFOR

(71) Applicant: LG Electronics Inc., Seoul (KR)

(72) Inventors: Hanul Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/633,957

(22) PCT Filed: Jul. 20, 2018

(86) PCT No.: PCT/KR2018/008197
§ 371 (c)(1),
(2) Date: Jan. 24, 2020

(87) PCT Pub. No.: WO2019/022439
PCT Pub. Date: Jan. 31, 2019

(65) Prior Publication Data
US 2020/0221289 A1 Jul. 9, 2020

Related U.S. Application Data (60) Provisional application No. 62/537,005, filed on Jul. 26, 2017.

(51) Int. Cl.
*H04W 8/24* (2009.01)
*H04L 5/00* (2006.01)

(52) U.S. Cl.
CPC .............. *H04W 8/24* (2013.01); *H04L 5/001* (2013.01)

(58) Field of Classification Search
CPC .......... H04W 8/24; H04W 88/02; H04L 5/001
(Continued)

(56) References Cited

U.S. PATENT DOCUMENTS

| 10,314,054 B2* | 6/2019 | Pao | ..................... H04B 7/0619 |
| 2014/0056200 A1* | 2/2014 | Koc | ..................... H04L 5/1446 |
| | | | 370/311 |

(Continued)

FOREIGN PATENT DOCUMENTS

| RU | 2607477 | 1/2017 |
| WO | WO2013172638 | 11/2013 |

OTHER PUBLICATIONS

3rd Generation Partnership Project; Technical Specification Group Radio Access Network; "Evolved Universal Terrestrial Radio Access (E-UTRA); Radio Resource Control (RRC); Protocol specification (Release 14)," 3GPP TS 36.331 V14.3.0, dated Jun. 2017, 745 pages.

(Continued)

*Primary Examiner* — Congvan Tran
(74) *Attorney, Agent, or Firm* — Fish & Richardson P.C.

(57) ABSTRACT

The present invention relates to a wireless communication system. More specifically, the present invention relates to a method and a device for handling of a prohibit timer to transmit a RRC message related to UE capability restriction in wireless communication system, the method comprising: transmitting a first UE Assistance Information message indicating temporary information related to UE capability, when the UE has overheating problem; starting a timer when the first UE Assistance Information message is transmitted; and transmitting a second UE Assistance Information message if temporary information related to UE capability in the second UE Assistance Information is changed from the temporary information related to UE capability in the first UE Assistance Information message while the timer is
(Continued)

running. The UE is capable of communicating with at least one of another UE, a UE related to an autonomous driving vehicle, a base station, or a network.

10 Claims, 10 Drawing Sheets

(58) Field of Classification Search
USPC .................................................. 370/328–329
See application file for complete search history.

(56) References Cited

U.S. PATENT DOCUMENTS

| | | | |
|---|---|---|---|
| 2015/0105062 | A1 | 4/2015 | Quan et al. |
| 2016/0337904 | A1* | 11/2016 | Hsu ....................... H04W 8/205 |
| 2018/0160271 | A1* | 6/2018 | Vutukuri ............. H04W 12/069 |
| 2020/0382945 | A1* | 12/2020 | Yang ..................... H04W 76/20 |

OTHER PUBLICATIONS

Huawei device, Huawei, HiSilicon, "Introduction of the overheating indication," R2-1706075, 3GPP TSG-RAN WG2 Meeting #98, Hangzhou, China, dated May 15-19, 2017, 46 pages.

LG Electronics Inc., "Assistance Information for Temporary Capability Restriction," R2-1705275, 3GPP TSG-RAN WG2 Meeting #98, Hangzhou, China, dated May 15-19, 2017, 3 pages.

PCT International Search Report and Written Opinion in International Application No. PCT/KR2018/008197, dated Oct. 25, 2018, 10 pages.

Xiaomi Communications, "On the UE overheating problem," R2-1705386, 3GPP TSG-RAN WG2 Meeting #98, Hangzhou, China, dated May 15-19, 2017, 3 pages.

EP Extended European Search Report in European Appln. No. 18838714.6, dated Feb. 16, 2021, 15 pages.

Huawei, "Report of email discussion [97bis#07][LTE/TEI14] UE overheating problem," R2-1705512, 3GPP TSG-RAN WG2 #98, Hangzhou, China, dated May 15-19, 2017, 15 pages.

Huawei, HiSilicon, MediaTek Inc., "Thermal issues with high capability UEs," R2-1701835, 3GPP TSG-RAN WG2 #97, Athens, Greece, dated Feb. 13-17, 2017, 5 pages.

LG Electronics Inc., "Prohibit timer for the overheating solution," R2-1708752, 3GPP TSG-RAN2 Meeting #99, Berlin, Germany, dated Aug. 21-25, 2017, 3 pages.

Office Action in European Appln. No. 18838714.6, dated Sep. 8, 2021, 7 pages.

* cited by examiner

(a) Control-Plane Protocol Stack (b) User-Plane Protocol Stack

(a) Control-Plane Protocol Stack (b) User-Plane Protocol Stack

METHOD FOR HANDLING OF A PROHIBIT TIMER TO TRANSMIT A RRC MESSAGE RELATED TO UE CAPABILITY RESTRICTION IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/008197, filed on Jul. 20, 2018, which claims the benefit of U.S. Provisional Application No. 62/537,005, filed on Jul. 26, 2017. The disclosures of the prior applications are incorporated by reference in their entirety.

TECHNICAL FIELD

The present invention relates to a wireless communication system and, more particularly, to a method for handling of a prohibit timer to transmit a Radio Resource Control (RRC) message related to UE capability restriction in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
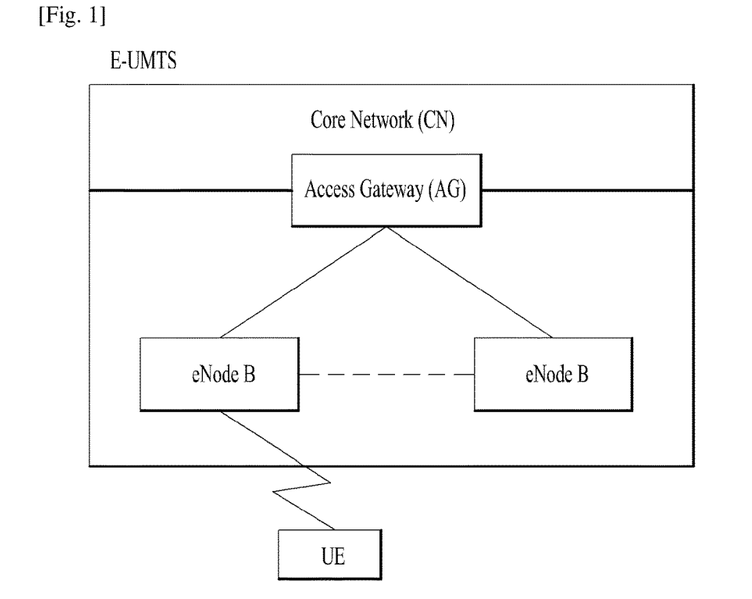
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE OF INVENTION

Technical Problem

An object of the present invention devised to solve the problem lies in a method and device for handling of a prohibit timer to transmit a RRC message related to UE capability restriction in wireless communication system.

In prior art, after the UE is configured by RRCConnectionReconfiguration from the network, there is no way that the UE requests directly to change configuration. However, in RAN2 #98, RAN2 discussed a new scheme that the UE transmits UEAssistanceInformation message with preference parameter such as preference UE category, RF-parameters or preference performance level to solve the problem when the overheating problem occurs in the UE. In other words, the UE can expect to receive the changed configuration through this assistance information. On this, we require a new method to prevent frequent signaling to solve overheating problem, and a prohibit timer is considered to avoid frequent signaling.

By the way, the UE may experience an extreme overheating problem if the UE is not allowed to report a lower temporary capability while the prohibit timer is running even though the temperature of UE increases exponentially. Additionally, even though the temperature of UE is low enough to be configured with a high UE capability, if the UE is not allowed to report a higher temporary capability when the prohibit timer is running, the UE may be configured with a lower UE capability as if the UE has the overheating problem.

The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

The invention is that a UE should be allowed to transmit UE Assistance Information message to report changed temporary capability compared to the previous reported temporary capability by handling the prohibit timer.

According to the present invention, since the UE can transmits UE Assistance Information message if the temporary capability in the UE Assistance Information message is changed to the previous reported temporary capability even though the prohibit timer is running, the UE can escape from the extreme overheating problem.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
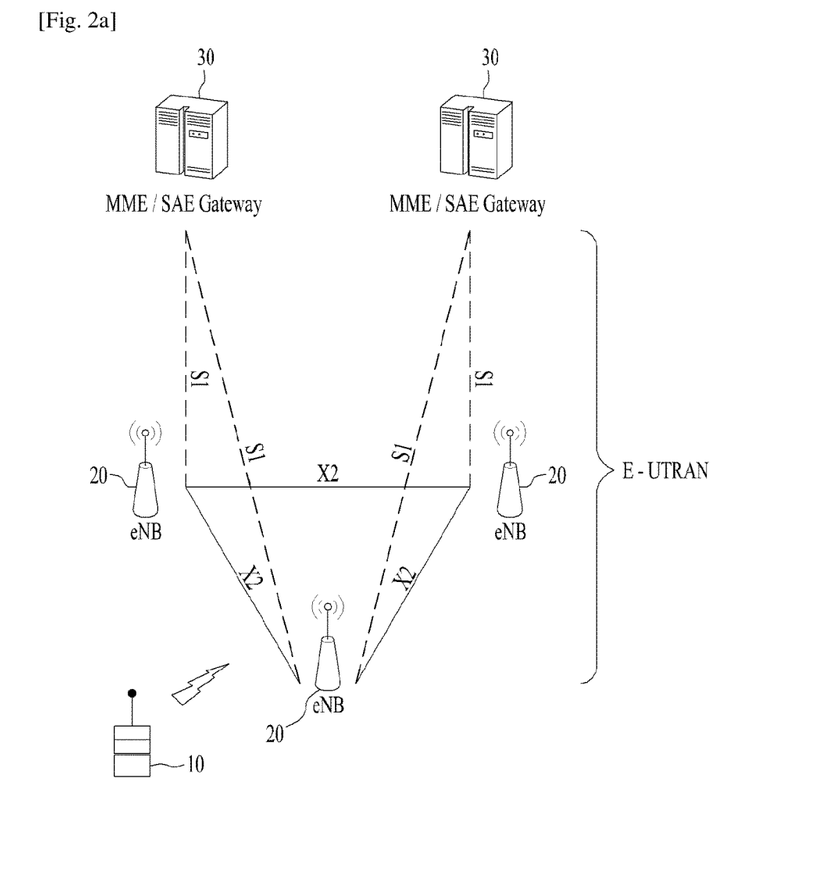
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
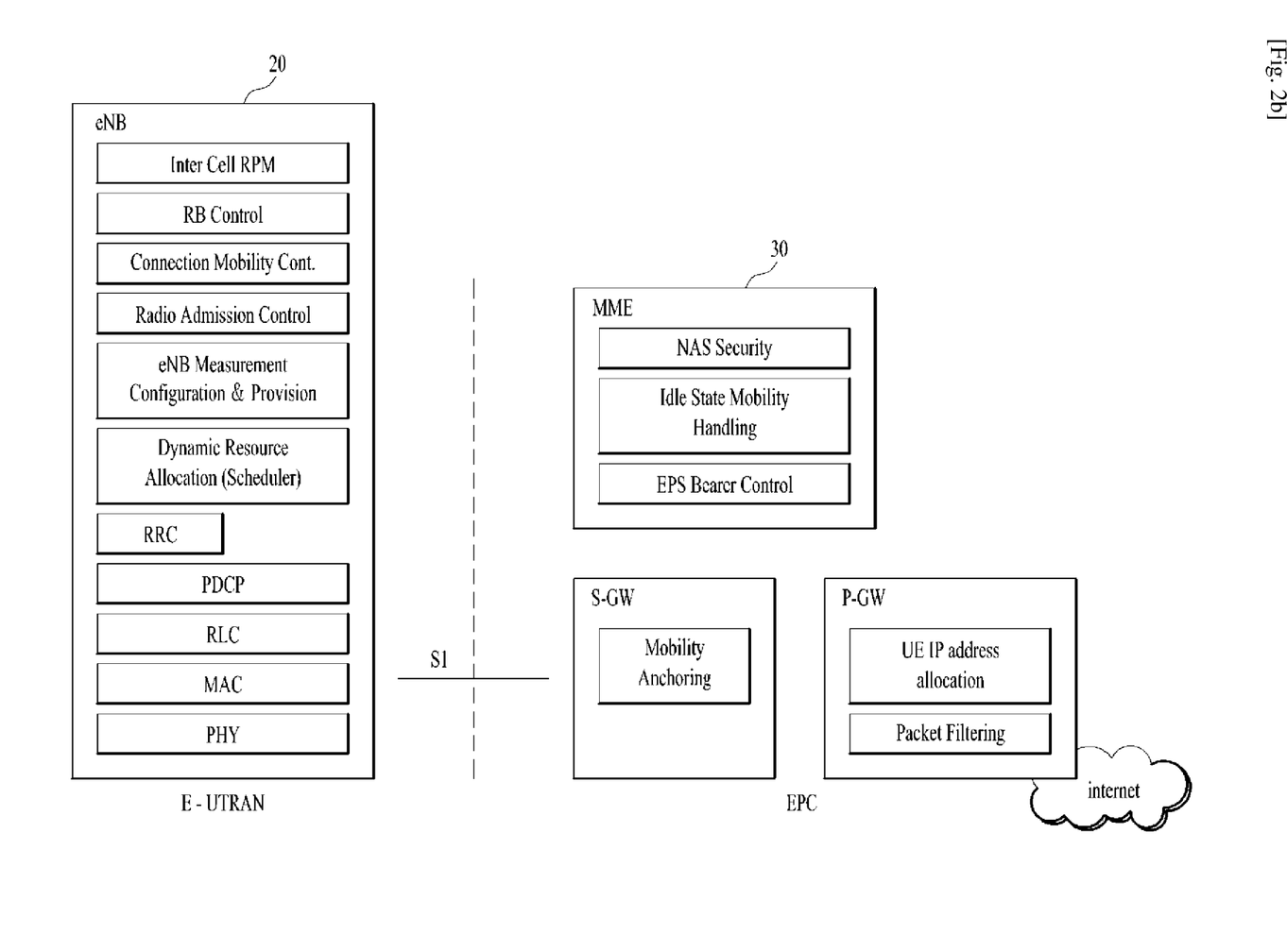
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
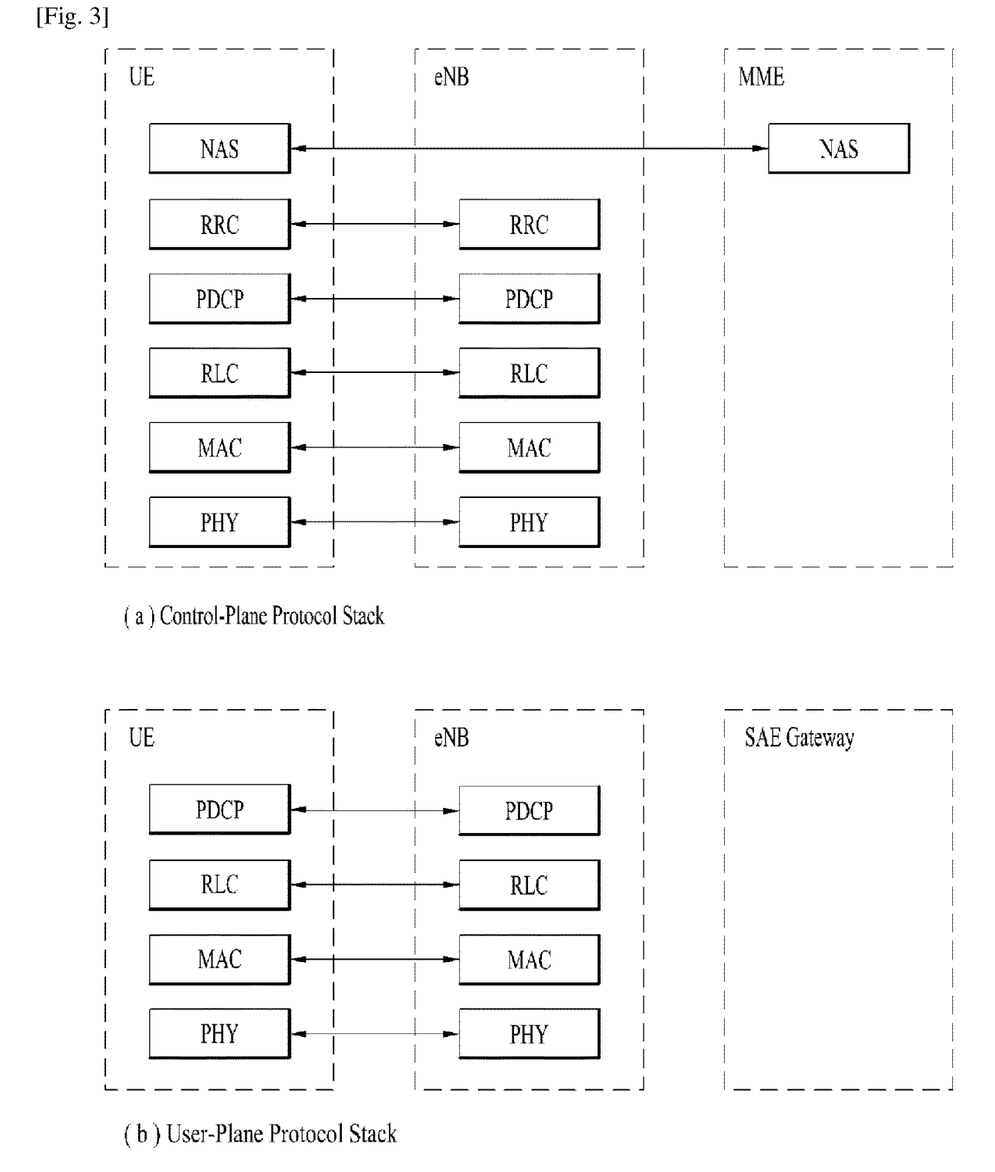
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
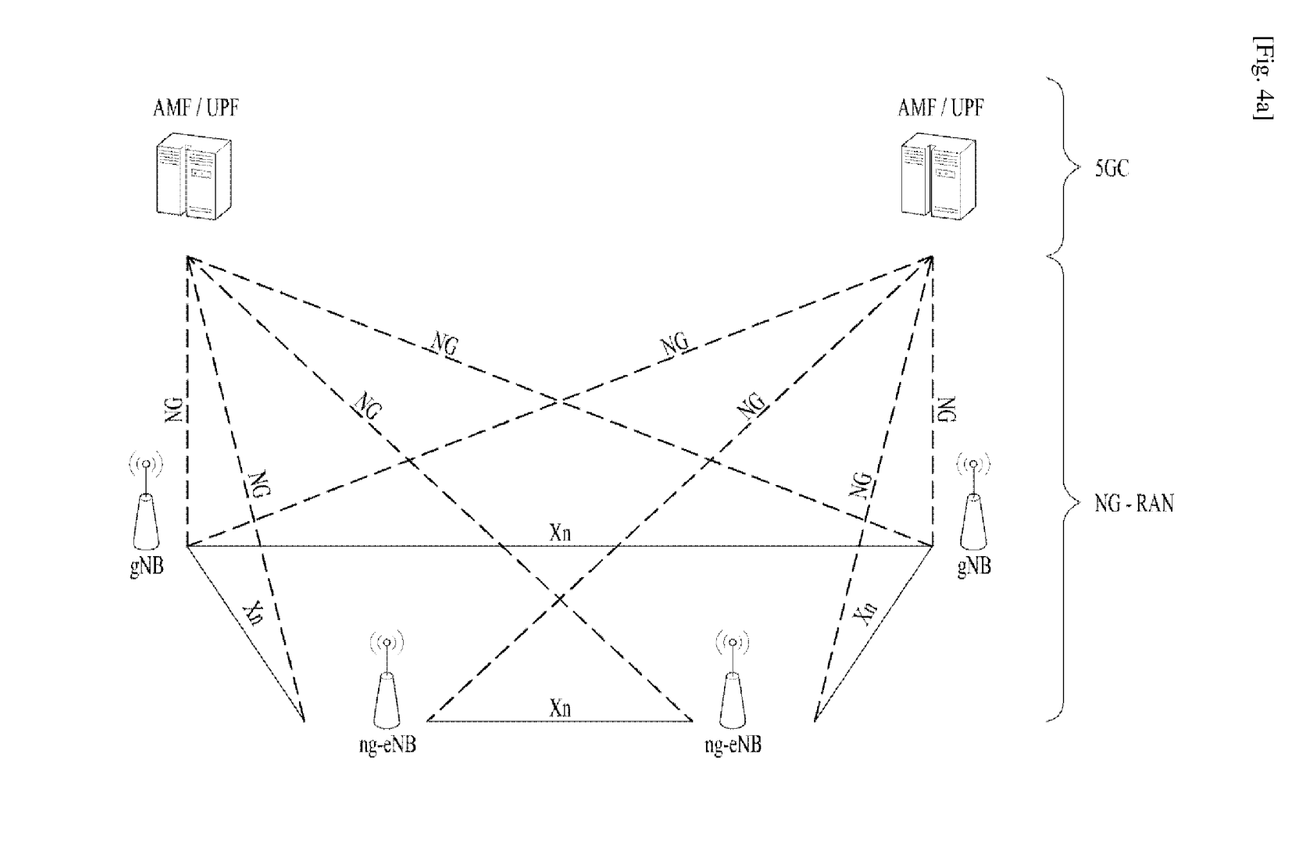
FIG. 4a is a block diagram illustrating network structure of NG Radio Access Network (NG-RAN) architecture.
Figure 4B:
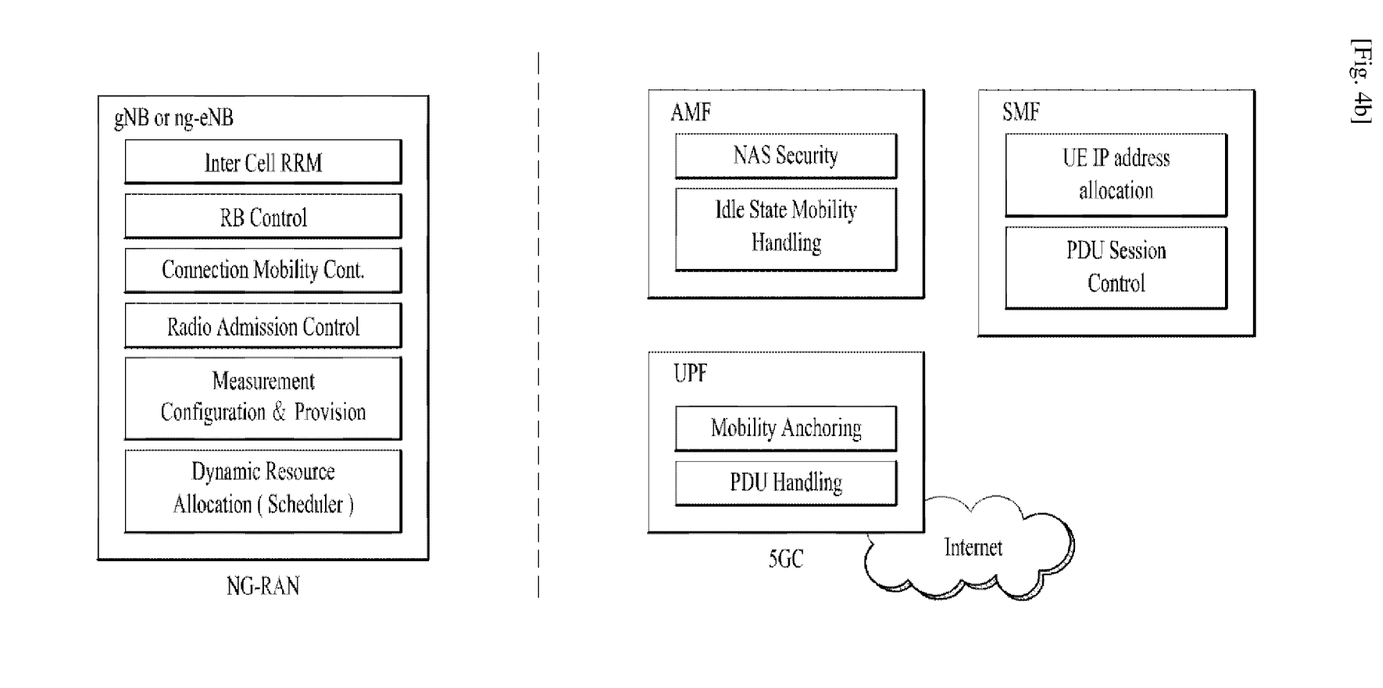
FIG. 4b is a block diagram depicting architecture of functional Split between NG-RAN and 5G Core Network (5GC)

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
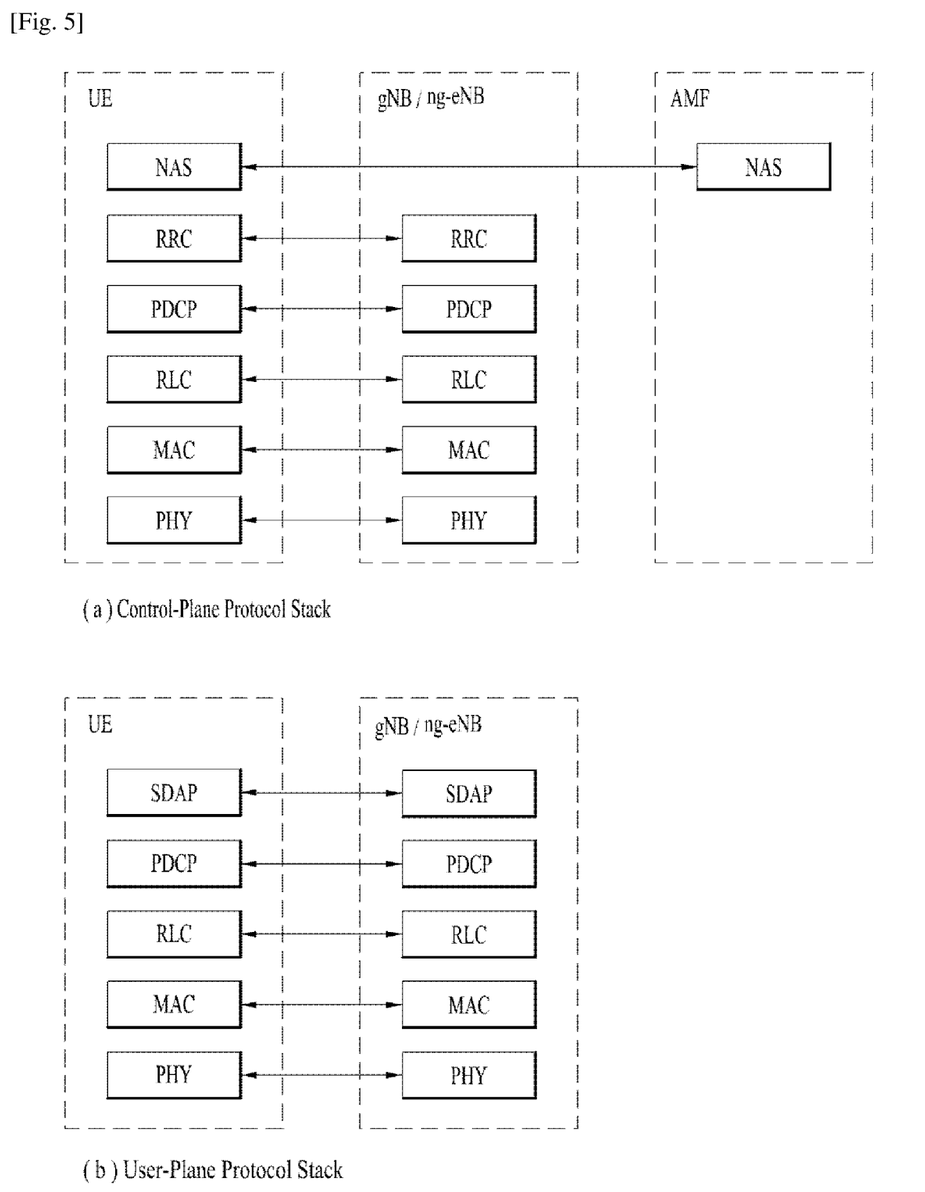
FIG. 5 is a diagram showing a control plane and a user plane of a radio interface protocol between a UE and a NG-RAN based on a 3rd generation partnership project (3GPP) radio access network standard.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
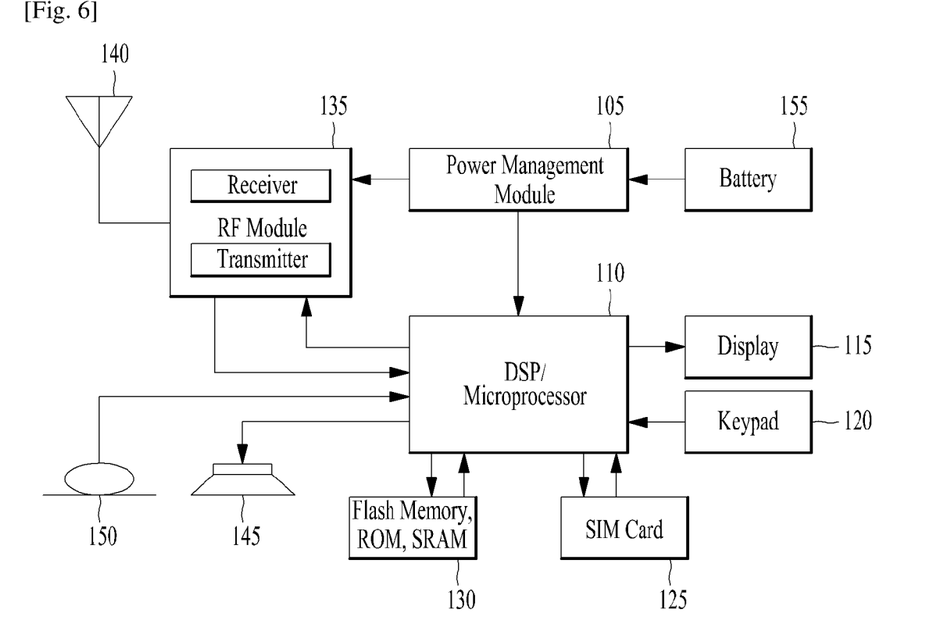
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 7:
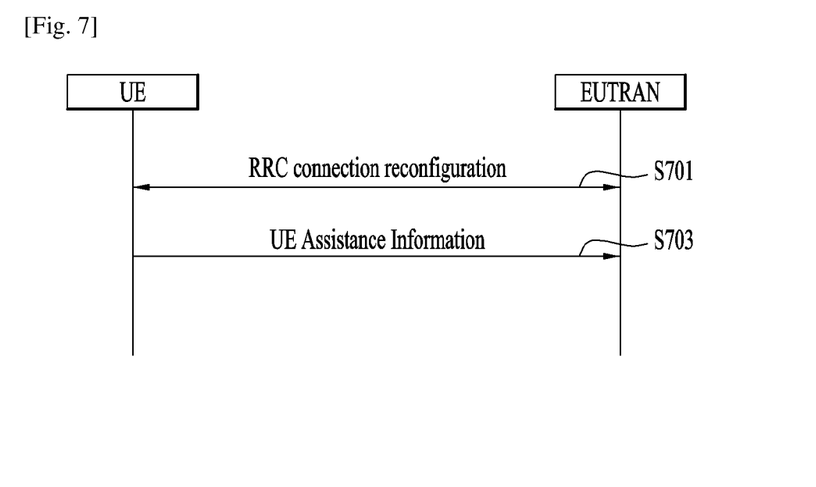
FIG. 7 is a diagram for transmitting UEAssistanceInformation message for overheating assistance indication.

FIG. 7 is a diagram for transmitting UEAssistanceInformation message for overheating assistance indication.

In prior art, after the UE is configured by RRCConnectionReconfiguration from the network, there is no way that the UE requests directly to change configuration. However, RAN2 discussed a new scheme that the UE transmits UEAssistanceInformation message with preference parameter such as preference UE category, RF-parameters or preference performance level to solve the problem when the overheating problem occurs in the UE. In other words, the UE can expect to receive the changed configuration through this assistance information.

For this, when the UE is configured by RRCConnectionReconfiguration (S701), if the UE experiences internal overheating, the UE can UEAssistanceInformation can be used to report temporary capability (S703).

If the UE prefers to temporarily reduce its DL category and UL category, UEAssistanceInformation message includes reducedUE-Category in the OverheatingAssistance IE, and sets reducedUE-CategoryDL to the number to which the UE prefers to temporarily reduce its DL category, and reducedUE-CategoryUL to the number to which the UE prefers to temporarily reduce its UL category.

If the UE prefers to temporarily reduce the number of maximum secondary component carriers, UEAssistanceInformation message includes reducedMaxCCs in the OverheatingAssistance IE, sets reducedCCsDL to the number of maximum SCells the UE prefers to be temporarily configured in downlink, and reducedCCsUL to the number of maximum SCells the UE prefers to be temporarily configured in uplink.

However, there is an issue on how often the message would be allowed to be transmitted while having overheating problem.

If there is no restriction to UE to report the same temporary capability repeatedly while having the problem, it is not helpful to solve the problem, but it makes the overheating problem become worse because the power consumption increases due to transmitting the message repeatedly. Therefore, we think that a method is needed to avoid frequent signalling to report temporary capability. For this, a prohibit timer is considered to avoid frequent signaling.

So, the UE transmits the UEAssistanceInformation message for overheating assistance indication, the UE starts the prohibit timer (e.g. T345) with a timer value set to the overheatingIndicationProhibitTimer.

While the prohibit timer is running, the UEAssistanceInformation message for overheating assistance indication is prevented from being transmitted.

Firstly, as we can see above, we think it is redundant for the UE to report the same temporary capability repeatedly. Thus, when the prohibit timer is running, it make sense not to be allowed to transmit UEAssistanceInformation message to report same temporary capability compared to the previous reported temporary capability.

However, it may be more reasonable to allow temporary capability reporting when the temporary capability is changed compared to a previous reported temporary capability due to the aggravated or alleviated overheating problem, although the prohibit timer is running.

For example, the UE may experience an extreme overheating problem if the UE is not allowed to report a lower temporary capability while the prohibit timer is running even though the temperature of UE increases exponentially. Additionally, even though the temperature of UE is low enough to be configured with a high UE capability, if the UE is not allowed to report a higher temporary capability when the prohibit timer is running, the UE may be configured with a lower UE capability as if the UE has the overheating problem.

Figure 8:
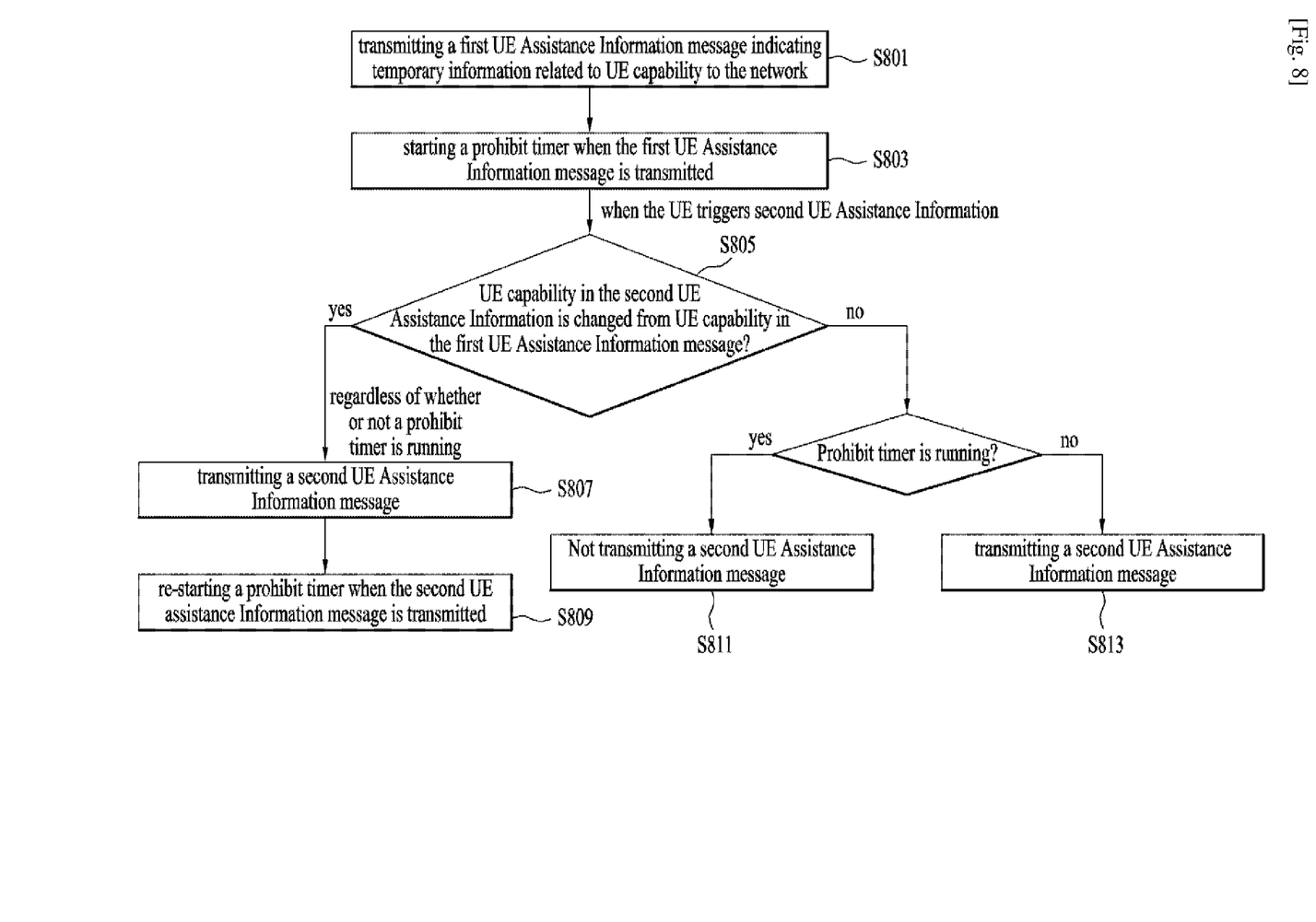
FIG. 8 is a conceptual diagram for handling of a prohibit timer to transmit a RRC message related to UE capability restriction in wireless communication system according to embodiments of the present invention.

FIG. 8 is a conceptual diagram for handling of a prohibit timer to transmit a RRC message related to UE capability restriction in wireless communication system according to embodiments of the present invention.

In this invention, the UE can transmits UE Assistance Information message if the temporary capability in the UE Assistance Information message is changed to the previous reported temporary capability even though the prohibit timer is running.

The UE informs the network about (full) UE capability information without any restriction. The network (e.g. RAN node such as eNB and gNB, CN node such as MME and AMF) stores the UE capability information.

The CN node informs the RAN node about the UE capability information. The RAN node configures parameters to UE.

When the UE detect a problem such as overheating in the UE side, the UE transmits a first UE Assistance Information message indicating temporary information related to UE capability to the network (S801).

The UE starts a prohibit timer when the first UE Assistance Information message is transmitted (S803), in a state that the temporary information related to UE capability in the first UE Assistance Information message is not same as previous message.

Wherein, the temporary information related to UE capability is one of followings:

1) the percentage of Max capability (e.g. 50% of Max throughput), or 2) certain data rate (e.g. the UE supporting DL 1 Gbps signals 100 Mbps), or 3) up or down of data rate (e.g. the UE receiving DL 300 Mbps signals down for decreasing throughput), or 4) certain ue-Category (e.g. the UE supporting ue-Category 12 signals ue-Category 4), or 5) MIMO capability (e.g. the UE supporting 4×4 MIMO signals 2×2 MIMO), or 6) the information related to Carrier Aggregation (or a number of maximum component carriers that the UE can support) (e.g. the UE supporting 3CA signals 2CA), or 7) some information that can change the current UE behavior, or 8) requirement for lower performance/higher performance, or 9) current status as like exact temperature or high/middle/low temperature, or 10) preferred status as like lower temperature or lower performance, or 11) UE category (e.g. category 4 or category 6), or 12) RF-parameter (specified in 36.331).

Preferably, The first UE Assistance Information message indicates the lower direction to restricted UE capability, lower UE category, or reconfiguration of one or more parameters to lower performance e.g. due to overheating problem.

If the UE triggers the same type of a message (e.g. second UE Assistance Information message), the UE checks whether or not the temporary information related to UE capability in the second UE Assistance Information is changed from the temporary information related to UE capability in the first UE Assistance Information message (S805).

The UE transmits a second UE Assistance Information message if temporary information related to UE capability in the second UE Assistance Information is changed from the temporary information related to UE capability in the first UE Assistance Information message while the timer is running (S807). The UE re-starts the timer when the UE transmits the second UE Assistance Information message (S809).

For example, if the second UE Assistance Information message indicates an even lower direction compared to the first UE Assistance Information due to severe overheating problem (e.g. the second UE Assistance Information message indicates the lower direction to further restricted UE capability, even lower UE category, or reconfiguration of one or more parameters to even lower performance), the UE transmits the second UE Assistance Information message regardless of whether or not the prohibit timer is running, and then re-start the prohibit timer, if running.

Or, if the second UE Assistance Information message indicates an higher direction compared to the first UE Assistance Information due to relaxed overheating problem (e.g. the second UE Assistance Information message indicates the higher direction to further restricted UE capability, even higher UE category, or reconfiguration of one or more parameters to even higher performance), the UE transmits the second UE Assistance Information message regardless of whether or not the prohibit timer is running, and then re-start the prohibit timer, if running.

The UE doesn't transmit the second UE Assistance Information message if the temporary information related to UE capability in the second UE Assistance Information is same as the temporary information related to UE capability in the first UE Assistance Information message while the timer is running (S811). And when the prohibit timer is not running or expired, the UE transmit the second UE Assistance Information message (S813).

Alternatively, when the first UE Assistance Information message indicates the lower direction to restricted UE capability, lower UE category, or reconfiguration of one or more parameters to lower performance e.g. due to overheating problem, the UE transmits the second UE Assistance Information message regardless of whether or not the prohibit timer is running only if the second UE Assistance Information message indicates an even lower direction.

In this case, if the second UE Assistance Information message indicates a higher direction or contains the same UE capability compared to the previous message and if the prohibit timer is running, the UE does not transmit the message. And when the prohibit timer is not running or expired, the UE transmit the second UE Assistance Information message.

In this method, while a prohibit timer for preventing unnecessary message transmission is operated in the same manner as the conventional method, the UE transmits the second UE Assistance Information message even if the prohibit timer is running, in case of a message including information other than the previous transmission, thereby ensuring transmission of the corresponding message.

Figure 9:
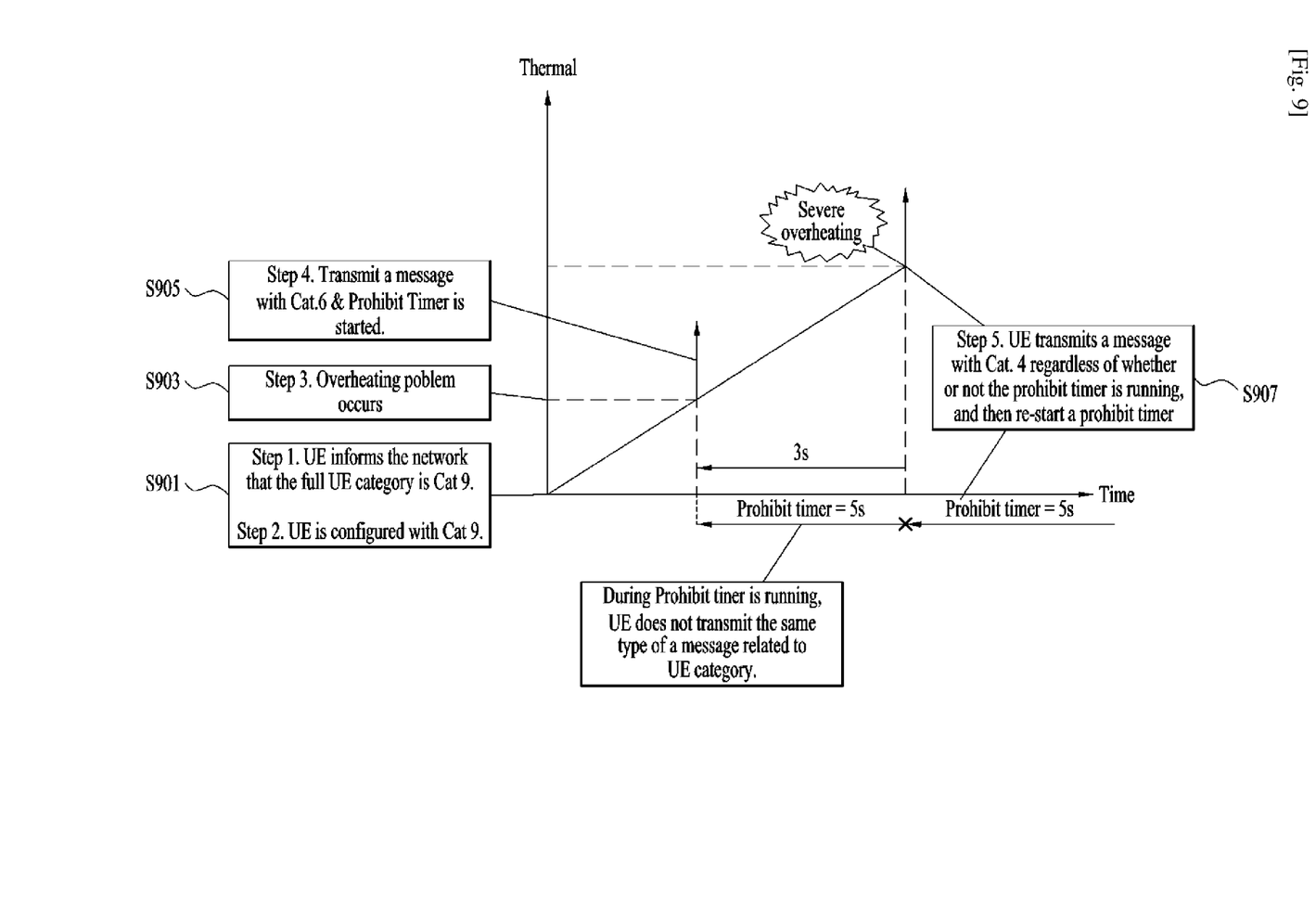
FIG. 9 is an example for handling of a prohibit timer to transmit a RRC message related to UE capability restriction in wireless communication system according to embodiments of the present invention.

FIG. 9 is an example for handling of a prohibit timer to transmit a RRC message related to UE capability restriction in wireless communication system according to embodiments of the present invention.

For example, we assumes that the UE can report preference UE capability to solve overheating problem and is configured the prohibit timer=5 sec to avoid frequent signaling, and the UE is configured category 9 and has overheating problem (S901).

When the UE overheating problem occurs (S903), the UE transmits UEAssistanceInformation with category 6 to solve overheating problem, the prohibit timer should be started (S905).

Even though UE requests the category 6 to the network, the problem may be worse while the prohibit timer is running. In this case, UE needs lower UE category (e.g. Cat.4), and the UE transmits UEAssitanceInformation with lower UE category to overcome this worse problem even though the prohibit timer is running (S907).

Figure 10:
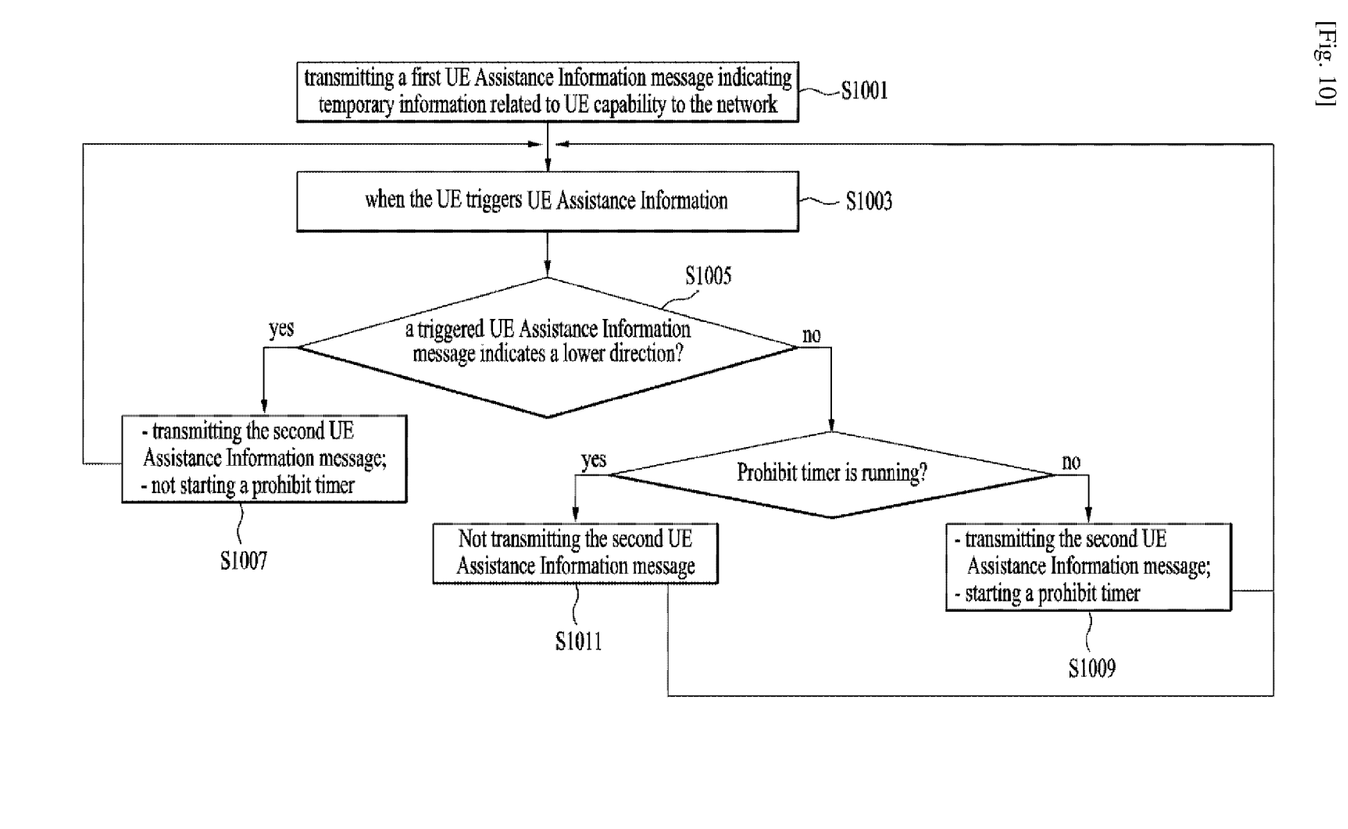
FIG. 10 is a conceptual diagram for handling of a prohibit timer to transmit a RRC message related to UE capability restriction in wireless communication system according to embodiments of the present invention.

FIG. 10 is a conceptual diagram for handling of a prohibit timer to transmit a RRC message related to UE capability restriction in wireless communication system according to embodiments of the present invention.

In this method, a prohibit timer can be started by only one direction, e.g. only if the capability restriction related message indicates the lower direction, a prohibit timer is started or re-started, and vice versa.

The UE informs the network about (full) UE capability information without any restriction. The network (e.g. RAN node such as eNB and gNB, CN node such as MME and AMF) stores the UE capability information.

The CN node informs the RAN node about the UE capability information. The RAN node configures parameters to UE.

When the UE detect a problem such as overheating in the UE side, the UE transmits a first UE Assistance Information message indicating temporary information related to UE capability to the network (S1001).

Wherein, the temporary information related to UE capability is one of followings:

1) the percentage of Max capability (e.g. 50% of Max throughput), or 2) certain data rate (e.g. the UE supporting DL 1 Gbps signals 100 Mbps), or 3) up or down of data rate (e.g. the UE receiving DL 300 Mbps signals down for decreasing throughput), or 4) certain ue-Category (e.g. the UE supporting ue-Category 12 signals ue-Category 4), or 5) MIMO capability (e.g. the UE supporting 4×4 MIMO signals 2×2 MIMO), or 6) the information related to Carrier Aggregation (or a number of maximum component carriers that the UE can support) (e.g. the UE supporting 3CA signals 2CA), or 7) some information that can change the current UE behavior, or 8) requirement for lower performance/higher performance, or 9) current status as like exact temperature or high/middle/low temperature, or 10) preferred status as like lower temperature or lower performance, or 11) UE category (e.g. category 4 or category 6), or 12) RF-parameter (specified in 36.331).

When the UE triggers UE Assistance Information (S1003), the UE checks whether the same type of a message which indicates a lower direction compared to the previous first UE Assistance Information message is triggered or not (S1005).

If the UE triggers the same type of a message which indicates a lower direction compared to the previous first UE Assistance Information message (e.g, the second UE Assistance Information message indicates the lower direction to further restricted UE capability, even lower UE category, or reconfiguration of one or more parameters to even lower performance e.g. due to severe overheating problem), the UE transmits the second UE Assistance Information message and a prohibit timer is not started also (S1007).

On the other hand, if the UE triggers the same type of a message which indicates a higher direction compared to the previous first UE Assistance Information message (e.g. the second UE Assistance Information message indicates the higher direction to higher UE capability, higher UE category, or reconfiguration of one or more parameters to higher performance e.g. due to relaxed overheating problem), the UE transmit the second UE Assistance Information message, and the UE start or re-start the prohibit timer if the prohibit timer is not running or expired (S1009).

If a prohibit timer is running, the UE does not transmit the second UE Assistance Information message even though the second UE Assistance Information message indicates a higher direction compared to the previous first UE Assistance Information message.

This method guarantees transmission of a message indicating a lower direction by not starting a prohibit timer if transmitting a message indicates a lower direction compared to the previous message.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NRsystem.

The invention claimed is:

1. A method performed by a User Equipment (UE) operating in a wireless communication system, the method comprising:
    transmitting a first UE Assistance Information message including temporary information related to UE capability, based on the UE having an overheating problem;
    starting a prohibit timer based on the first UE Assistance Information message being transmitted; and
    transmitting a second UE Assistance Information message based on temporary information related to UE capability in the second UE Assistance Information message being changed from the temporary information related to UE capability in the first UE Assistance Information message, even though the prohibit timer is running,
    wherein the temporary information related to UE capability is a number of maximum component carriers that the UE can support.

2. The method according to claim 1, wherein the UE does not transmit the second UE Assistance Information message based on the temporary information related to UE capability in the second UE Assistance Information message being same as the temporary information related to UE capability in the first UE Assistance Information message, while the prohibit timer is running.

3. The method according to claim 1, further comprising:
    re-starting the prohibit timer based on the second UE Assistance Information message being transmitted.

4. The method according to claim 1, wherein based on the temporary information related to UE capability in the second UE Assistance Information message being changed from the temporary information related to UE capability in the first UE Assistance Information message, the temporary information related to UE capability in the second UE Assistance Information message is lower or higher than the temporary information related to UE capability in the first UE Assistance Information message.

5. The method according to claim 1, wherein the prohibit timer is for prohibiting transmission of a UE Assistance Information message.

6. A User Equipment (UE) configured to operate in a wireless communication system, the UE comprising:
    a Radio Frequency (RF) module; and
    a processor operably coupled with the RF module and configured to:

transmit a first UE Assistance Information message including temporary information related to UE capability, based on the UE having an overheating problem, start a prohibit timer based on the first UE Assistance Information message being transmitted, and transmit a second UE Assistance Information message based on temporary information related to UE capability in the second UE Assistance Information message being changed from the temporary information related to UE capability in the first UE Assistance Information message, even though the prohibit timer is running, wherein the temporary information related to UE capability is a number of maximum component carriers that the UE can support.

7. The UE according to claim 6, wherein the UE does not transmit the second UE Assistance Information message based on the temporary information related to UE capability in the second UE Assistance Information message being same as the temporary information related to UE capability in the first UE Assistance Information message, while the prohibit timer is running.

8. The UE according to claim 6, wherein the processor is further configured to:

re-start the prohibit timer based on the second UE Assistance Information message being transmitted.

9. The UE according to claim 6, wherein based on the temporary information related to UE capability in the second UE Assistance Information message being changed from the temporary information related to UE capability in the first UE Assistance Information message, the temporary information related to UE capability in the second UE Assistance Information message is lower or higher than the temporary information related to UE capability in the first UE Assistance Information message.

10. The UE according to claim 6, wherein the prohibit timer is for prohibiting transmission of a UE Assistance Information message.

* * * * *